(12) United States Patent
Yan et al.

(10) Patent No.: US 11,853,167 B2
(45) Date of Patent: Dec. 26, 2023

(54) METHOD, ELECTRONIC DEVICE AND COMPUTER PROGRAM PRODUCT FOR BACKUP

(71) Applicant: EMC IP Holding Company LLC, Hopkinton, MA (US)

(72) Inventors: Jinru Yan, Shanghai (CN); Mengze Liao, Shanghai (CN); Min Liu, Shanghai (CN); Xiaoliang Zhu, Shanghai (CN); Zheyi Zhu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 16/917,851

(22) Filed: Jun. 30, 2020

(65) Prior Publication Data

US 2021/0374008 A1  Dec. 2, 2021

(30) Foreign Application Priority Data

May 29, 2020  (CN) .......................... 202010475743.X

(51) Int. Cl.
*G06F 11/14* (2006.01)
*G06N 5/04* (2023.01)

(52) U.S. Cl.
CPC ........... *G06F 11/1451* (2013.01); *G06N 5/04* (2013.01); *G06F 2201/80* (2013.01)

(58) Field of Classification Search
CPC .... G06F 11/1451; G06F 2201/80; G06N 5/04
See application file for complete search history.

(56) References Cited

U.S. PATENT DOCUMENTS 10,162,709 B1  12/2018 Lazier et al.
2009/0300633 A1*  12/2009 Altrichter ............. G06F 9/4856
                                                                711/E12.001
(Continued)

FOREIGN PATENT DOCUMENTS

CN   103176862 A   6/2013
CN   109032837 A   12/2018
(Continued)

OTHER PUBLICATIONS

Office Action and Search Report issued in corresponding Chinese Patent Application No. 202010475743.X dated Jul. 8, 2023 (25 pages).

*Primary Examiner* — Mark D Featherstone
*Assistant Examiner* — Tony Wu
(74) *Attorney, Agent, or Firm* — Chamberlain, Hrdlicka, White, Williams & Aughtry

(57) ABSTRACT

Embodiments of the present disclosure relate to a method, an electronic device, and a computer program product for backup. The method includes: determining a plurality of buffer periods associated with a plurality of pending backup operations of a plurality of objects, each buffer period being a preprocessing period for a corresponding pending backup operation. The method further includes: determining a plurality of predicted execution durations of the plurality of pending backup operations based on historical execution durations of respective historical backup operations of the plurality of objects. The method further includes: determining priorities of the plurality of pending backup operations based on the plurality of predicted execution durations and the plurality of buffer periods. The method further includes: executing the plurality of pending backup operations based on the priorities.

20 Claims, 6 Drawing Sheets

(56) References Cited

U.S. PATENT DOCUMENTS

| | | | | |
|---|---|---|---|---|
| 2011/0202504 A1* | 8/2011 | Cherkasova | ........ | G06F 11/1451 |
| | | | | 711/111 |
| 2014/0040573 A1* | 2/2014 | Cherkasova | ........ | G06F 11/1446 |
| | | | | 711/E12.103 |
| 2014/0180664 A1* | 6/2014 | Kochunni | ........... | G06F 11/3461 |
| | | | | 703/21 |
| 2016/0085574 A1 | 3/2016 | Dornemann et al. | | |
| 2018/0332138 A1* | 11/2018 | Liu | .................... | H04L 41/5041 |
| 2020/0364113 A1* | 11/2020 | Tormasov | ........... | G06F 11/1451 |

FOREIGN PATENT DOCUMENTS

| | | |
|---|---|---|
| CN | 109542620 A | 3/2019 |
| CN | 109684270 A | 4/2019 |
| CN | 109951662 A | 6/2019 |

* cited by examiner

METHOD, ELECTRONIC DEVICE AND COMPUTER PROGRAM PRODUCT FOR BACKUP

CROSS REFERENCE TO RELATED APPLICATIONS

This application claims priority to Chinese Patent Application No. 202010475743.X filed on May 29, 2020. Chinese Patent Application No. 202010475743.X is hereby incorporated by reference in its entirety.

TECHNICAL FIELD

Embodiments of the present disclosure relate to the field of data management, and more particularly, to a method, an electronic device, and a computer program product for backup.

BACKGROUND

With the development of computer technologies, there has been an increase in computer (or computer device) usage. During the use of a computer, significant amounts of data will be generated. Sometimes, data generated by the computer is very important to a user and, as such, needs to be backed up the event of computer device failure or damage.

Currently backups are implemented through a backup server. In order to ensure user requirements, for example, a recovery point objective (RPO) set by a user, the backup server usually backs up data according to the RPO. However, there are still many problems to be solved in the process of backing up data through the backup server.

SUMMARY OF THE INVENTION

The embodiments of the present disclosure provide a method, an electronic device, and a computer program product for backup.

In a first aspect of the present disclosure, a backup method is provided. The method includes: determining a plurality of buffer periods associated with a plurality of pending backup operations of a plurality of objects, each buffer period being a preprocessing period for a corresponding pending backup operation. The method further includes: determining a plurality of predicted execution durations of the plurality of pending backup operations based on historical execution durations of respective historical backup operations of the plurality of objects. The method further includes: determining priorities of the plurality of pending backup operations based on the plurality of predicted execution durations and the plurality of buffer periods. The method further includes: executing the plurality of pending backup operations based on the priorities.

According to a second aspect of the present disclosure, an electronic device is provided. The electronic device includes: at least one processor; and a memory, coupled to the at least one processor and having instructions stored thereon. When executed by the at least one processor, the instructions cause the device to perform the following actions including: determining a plurality of buffer periods associated with a plurality of pending backup operations of a plurality of objects, each buffer period being a preprocessing period for a corresponding pending backup operation; determining a plurality of predicted execution durations of the plurality of pending backup operations based on historical execution durations of respective historical backup operations of the plurality of objects; determining priorities of the plurality of pending backup operations based on the plurality of predicted execution durations and the plurality of buffer periods; and executing the plurality of pending backup operations based on the priorities.

According to a third aspect of the present disclosure, a computer program product is provided. The computer program product is tangibly stored on a nonvolatile computer-readable medium and includes machine-executable instructions; and the machine-executable instructions, when executed, cause a machine to perform the steps of the method in the first aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

In the accompanying drawings, the same or corresponding numerals represent the same or corresponding parts.

DETAILED DESCRIPTION

Figure 1:
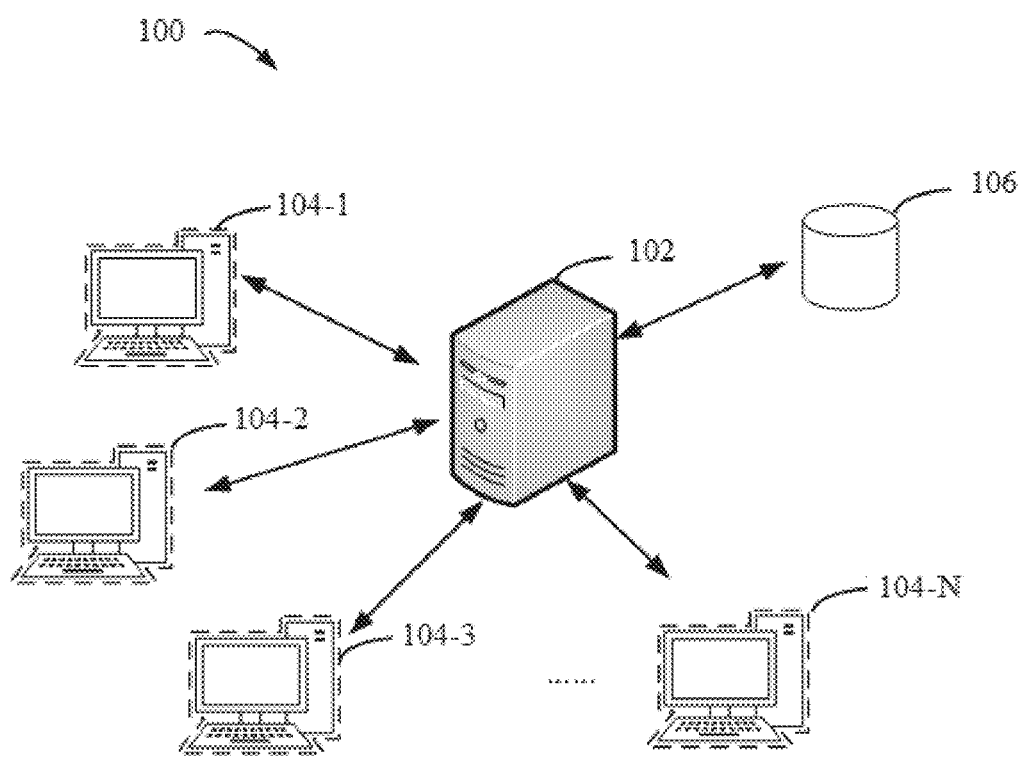
FIG. 1 illustrates a schematic diagram of example environment 100 where a device and/or a method according to an embodiment of the present disclosure may be implemented.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms should be understood as open-ended inclusion, i.e., "including but not limited to." The term "based on" should be understood as "based at least in part on." The term "one embodiment" or "this embodiment" should be understood as "at least one embodiment." The terms "first," "second," etc. may refer to different or identical objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation on the scope of the present disclosure.

A user usually backs up, through a backup server, data of an object (for example, a virtual machine) used. In order to be able to recover the data within a given time period, the user usually sets a threshold backup time interval (such as an RPO) for performing a backup operation on a task, so that when user equipment fails, a corresponding backup can be found within the threshold backup time interval. Therefore, the object needs to be backed up again within a threshold time interval after the last backup time. For example, if the RPO is set to 1 hour, the backup operation should be performed again within 1 hour after the start time of the last backup operation of the object.

However, different objects in the backup server have different backup strategies, for example, they have different threshold backup time intervals (such as RPOs). In addition, the number of objects that need to be backed up in different periods is also different. For example, there are many backup tasks during certain periods of the day, while there are fewer backup tasks during certain periods of the night. Therefore, system resources may have peak usage points in a cycle of one day. That is, for the same object, the time of backup operations at different times may be different. For example, a longer time is required for a backup operation during peak service hours and the data change rate is higher, while data changes less during a period of fewer services and the backup operation is faster. The above conditions may cause the backup operations to fail to meet a threshold time interval at a peak point.

Generally, by adding more resources, for example, more virtual machines or data protection engines are adopted to process backup tasks of these objects in parallel. However, adding resources only to solve the problems of a few peak points may lead to a waste of resources.

In addition, another existing solution is to configure the time of the backup operation to be shorter than an RPO requirement for objects that frequently fail. However, this requires a customer to know an appropriate scheduling interval, and when any change occurs, the user needs to re-execute scheduling of the backup. In addition, these operations are only post-processing measures taken after the failure has occurred, and may make a system busier and cause other backup tasks to fail.

In order to solve the above and other potential problems, the present disclosure provides a backup method. In this method, a computing device first determines a plurality of buffer periods associated with a plurality of pending backup operations of a plurality of objects. Then, the computing device determines a plurality of predicted execution durations of the plurality of pending backup operations based on historical execution durations of respective historical backup operations of the plurality of objects. The computing device determines priorities of the plurality of pending backup operations based on the plurality of predicted execution durations and the plurality of buffer periods. Finally, the computing device executes the plurality of pending backup operations based on the priorities. Through this method, it is possible to ensure that backup operations of more objects meet user requirements without increasing computing resources, thereby saving computing resources and improving computing resource utilization.

Hereinafter, FIG. 1 illustrates a schematic diagram of example environment 100 in which a device and/or a method according to an embodiment of the present disclosure may be implemented.

As shown in FIG. 1, example environment 100 includes computing device 102. Computing device 102 is configured to manage backups of a plurality of objects 104-1, 104-2, 104-3, . . . , and 104-N, where N is a positive integer. In order to describe the example, objects 104-1, 104-2, 104-3, . . . , and 104-N are collectively referred to as object 104. Object 104 may have various forms, such as a virtual machine, a database, a file set, and a mail set.

In the embodiment shown in FIG. 1, object 104 is a virtual machine. However, it should be understood that this is only exemplary and not limiting, and object 104 may be any data that is required or has been backed up by computing device 102.

Computing device 102 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Computing device 102 may implement a backup operation on data. When a user uses computing device 102 to manage a backup operation of object 104, a threshold backup time interval of object 104 is set on computing device 102. In order to ensure that the backup operation of object 104 meets the threshold time interval, a buffer period for performing the task in advance is usually also set. Therefore, a scheduling time interval of the backup operation of object 104 is a difference between the threshold backup time interval and the buffer period.

If the user executes the backup operation of object 104 at a first time, computing device 102 performs scheduling of a pending backup operation at a second time that is after the first time and determined by the scheduling time interval. In addition, computing device 102 determines other objects 104 of which the pending backup operations are to be executed at the second time. Alternatively or additionally, computing device 102 determines all objects 104 for the pending backup operation within a predetermined period around the second time as objects 104 of which the pending backup operations are to be executed at the second time.

Then, computing device 102 predicts a predicted duration of the pending backup operation of these objects 104. Computing device 102 determines execution priorities of these objects 104 at the second time based on the predicted duration and buffer periods of these objects 104.

It is possible for executing the pending backup operations of these objects 104 according to the determined priorities to ensure that backup operations of more objects 104 meet user requirements without increasing computing resources, thereby saving computing resources and improving computing resource utilization.

When computing device 102 performs a backup operation on object 104, a backup of object 104 will be stored in storage device 106 connected to computing device 102. In FIG. 1, it is shown that storage device 106 is external to computing device 102, which is only for illustrating the present disclosure, rather than specifically limiting the present disclosure. Those skilled in the art may provide it inside computing device 102.

Figure 2:
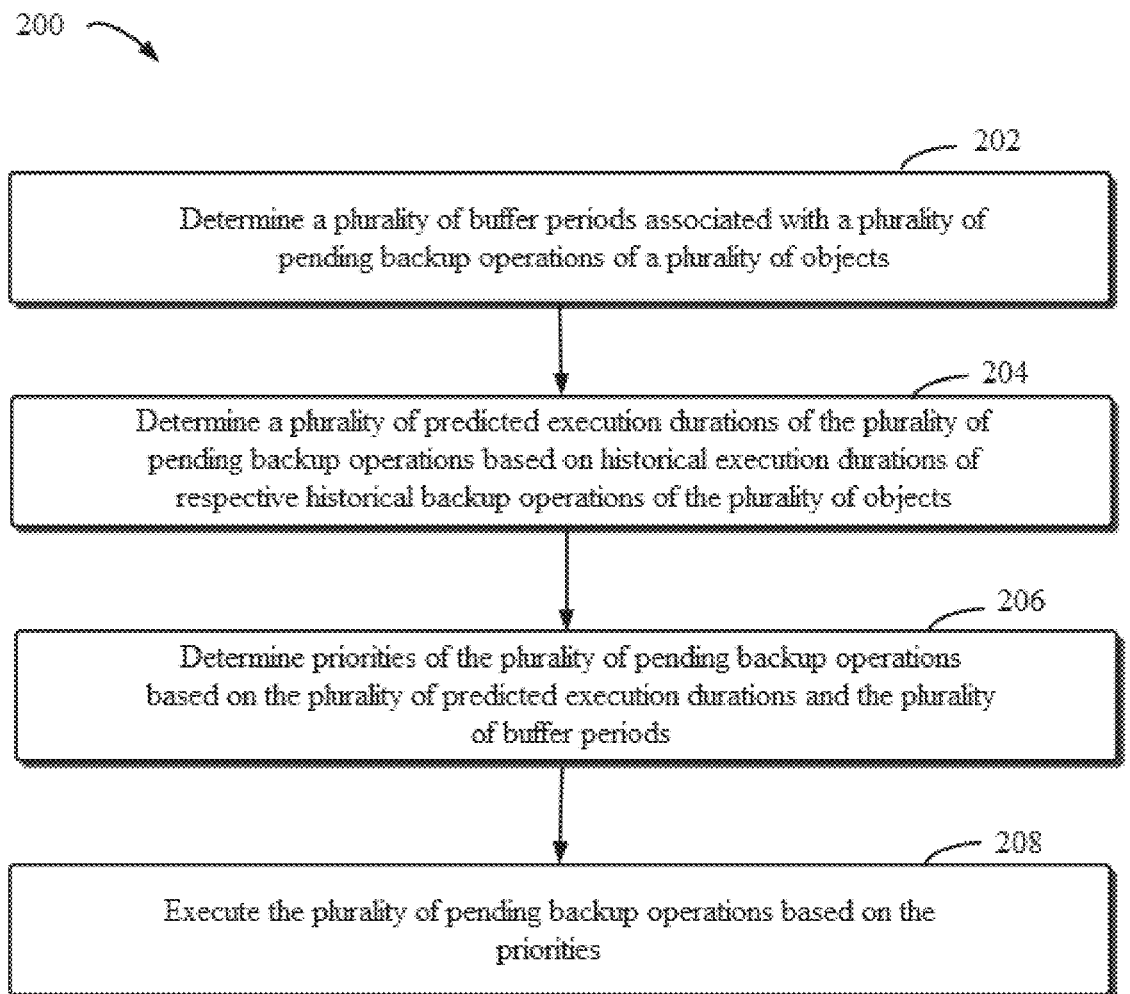
FIG. 2 shows a flowchart of method 200 for backup according to an embodiment of the present disclosure.

A schematic diagram of environment 100 in which a device and/or a method according to an embodiment of the present disclosure may be implemented is described above with reference to FIG. 1. Method 200 for backup according to an embodiment of the present disclosure is described below with reference to FIG. 2. Method 200 may be performed at computing device 102 in FIG. 1 or any other suitable devices.

At block 202, computing device 102 determines a plurality of buffer periods associated with a plurality of pending backup operations of a plurality of objects 104. Each buffer period is a preprocessing period for a corresponding pending backup operation. For each object 104, there may be a preset buffer period corresponding thereto. By setting the buffer period, the pending backup operation of object 104 may be performed in advance before a next time determined by a threshold backup period. The buffer period is a period during which backup operations are scheduled and executed in advance.

In some embodiments, each object 104 of the plurality of objects 104 includes a buffer period of a backup operation of object 104 in its metadata. Alternatively or additionally, the buffer period is preset, such as a user or a manager of computing device 102. Therefore, computing device 102 acquires the plurality of buffer periods from respective metadata of the plurality of objects 104.

In some embodiments, computing device 102 determines the pending backup operations of all objects 104 expected to be executed at a predetermined time. Computing device 102 determines that the pending backup operation needs to be scheduled at a predetermined time by checking the time of the last backup of object 104, a threshold backup period set by the user, and the preset buffer period. For example, object 104 is backed up at 1 o'clock, the threshold backup time set by the user is 1 hour, and then the next backup operation should be scheduled and executed before 2 o'clock. If the buffer period is half an hour, the pending backup operation of object 104 should be scheduled at 1:30. At the moment, computing device 102 also determines other pending backup operations scheduled and executed at 1:30.

In some embodiments, the plurality of buffer periods may be periods of the same length. In some embodiments, the plurality of buffer periods may be periods of different lengths. The above examples are only for describing the present disclosure, but specifically limiting the present disclosure.

In some embodiments, object 104 may include at least one of a virtual machine, a database, a file set, and a mail set. In one example, when object 104 is a virtual machine, a pending backup operation for the virtual machine is to back up a snapshot of the virtual machine at a certain time to storage device 106. In another example, when object 104 is a database, a file set, or a mail set, data of object 104 at a predetermined time is backed up to storage device 106 during a pending backup operation for object 104.

In some embodiments, the pending backup operation backs up the entire content of object 104. In some embodiments, the pending backup operation only backs up a modified part of object 104, by performing, e.g., an incremental backup. The above examples are only for describing the present disclosure, rather than specifically limiting the present disclosure.

At block 204, computing device 102 determines a plurality of predicted execution durations of the plurality of pending backup operations based on historical execution durations of respective historical backup operations of the plurality of objects 104. By using the historical execution durations, a duration of a backup operation to be executed at a next time may be estimated more accurately.

In some embodiments, computing device 102 acquires a plurality of historical execution durations of a plurality of historical backup operations of first object 104 among the plurality of objects 104 within a predetermined time window. For example, computing device 102 may acquire historical durations of historical backup operations within days or weeks before a scheduling execution time. Then, computing device 102 determines a predicted execution duration of a pending backup operation of the first object based on the plurality of historical execution durations.

When predicting the execution duration, computing device 102 may use various suitable methods to perform the prediction. In one embodiment, through a Holt-Winters seasonal prediction algorithm, the obtained historical execution durations are used to perform prediction. The above examples are only for describing the present disclosure, rather than specifically limiting the present disclosure. Those skilled in the art may also use any other suitable methods for prediction. In another embodiment, computing device 102 may perform weighted averaging on the plurality of historical execution durations to perform prediction. In yet another embodiment, the computing device only uses the historical execution durations of the same scheduling time as time to be computed but different dates for averaging to perform prediction. The above examples are only for describing the present disclosure, rather than specifically limiting the present disclosure.

At block 206, computing device 102 determines priorities of the plurality of pending backup operations based on the plurality of predicted execution durations and the plurality of buffer periods. After determining the plurality of predicted durations and the plurality of buffer periods, computing device 102 may determine priorities of pending backup operations of each object 104 using the data. The process of determining priorities will be described below with reference to FIG. 3.

At block 208, computing device 102 executes the plurality of pending backup operations based on the priorities. Computing device 102 executes these backup operations at a predetermined scheduling time using the determined priorities.

In some embodiments, computing device 102 determines an execution sequence of the plurality of pending backup operations based on the priorities of the plurality of pending backup operations. Then, computing device 102 executes the plurality of pending backup operations based on the execution sequence. Computing device 102 first executes a high-priority backup operation using a service of executing backup operations such as a virtual machine, and then executes a low-priority backup operation. In one example, if computing device 102 runs only one service of executing backup operations, the plurality of pending backup operations are queued according to the priorities, and then these pending backup operations are sequentially executed. If computing device 102 runs a plurality of tasks of executing backup operations, computing device 102 assigns pending backup operations to the plurality of tasks according to the priorities so that the pending backup operations with the same number as that of services may be concurrently executed in parallel. If one of the services completes a pending backup task, a next high-priority pending backup operation is assigned to the service.

In some embodiments, for each object 104 among the plurality of objects 104, computing device 102 determines an interval between a first time when a new backup is generated after the pending backup operation of object 104 is executed and a second time when a previous backup of object 104 is generated. For example, when object 104 is a virtual machine, a duration of an interval between a generation time of a newly backed-up snapshot of the virtual machine and a generation time of a previously backed-up snapshot of the virtual machine is determined. Computing device 102 compares the duration of the interval with a threshold duration. The threshold duration is a duration of a threshold backup period set by the user. When the duration of the interval is greater than the threshold duration, computing device 102 determines that an error of the pending backup operation for the first object occurs, indicating that requirements set by the user are not met. If the duration of the interval is less than the threshold duration, it indicates that the backup operation meets the user requirements.

Through this method, it is possible to ensure that backup operations of more objects meet user requirements without increasing computing resources, thereby saving computing resources and improving computing resource utilization.

Figure 3:
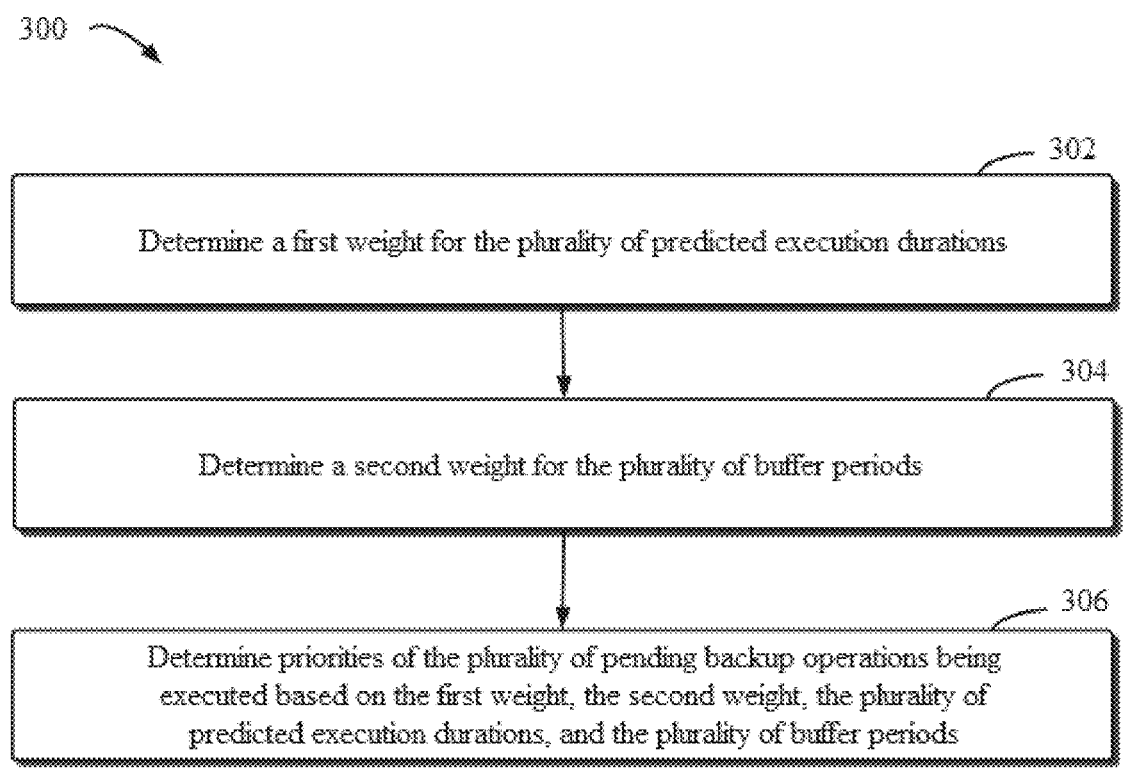
FIG. 3 shows a flowchart of method 300 for determining a priority according to an embodiment of the present disclosure.

The schematic diagram of method 200 for backup according to an embodiment of the present disclosure has been described above with reference to FIG. 2. The process of determining priorities at block 206 of FIG. 2 will be described below with reference to FIG. 3. FIG. 3 shows a flowchart of method 300 for determining priorities according to an embodiment of the present disclosure. Method 300 in FIG. 3 may be implemented by computing device 102 in FIG. 1 or any other suitable devices.

At block 302, computing device 102 determines a first weight for the plurality of predicted execution durations. The first weight identifies the importance of the plurality of predicted execution durations in determining priorities. In some embodiments, the first weight for identifying the importance of the predicted duration is preset. Alternatively or additionally, the first weight is the same for the predicted duration of any object 104.

At block 304, computing device 102 determines a second weight for the plurality of buffer periods. The second weight identifies the importance of the plurality of buffer periods in determining priorities. In some embodiments, the second weight for identifying the importance of the buffer periods is preset. Alternatively or additionally, the second weight is the same for the buffer periods of any object.

At block 306, computing device 102 determines priorities of the plurality of pending backup operations being executed based on the first weight, the second weight, the plurality of predicted execution durations, and the plurality of buffer periods.

In some embodiments, computing device 102 determines the priority of the pending backup operation by the following formula (1):

$$\text{Priority} = \frac{\text{First weight}}{\text{Predicted duration}} + \frac{\text{Second weight}}{\text{Buffer period}} \quad (1)$$

In some embodiments, the priorities of the plurality of pending backup operations may also be determined by the following mode. First, computing device 102 determines a plurality of third weights for the plurality of predicted execution durations. Each third weight identifies the importance of a predicted execution duration corresponding to each object 104 in determining priorities. In some embodiments, the third weights for the predicted durations of various objects 104 may be the same or different.

Then, computing device 102 determines a plurality of fourth weights for the plurality of buffer periods. Each fourth weight identifies the importance of a buffer period corresponding to each object 104 in determining priorities. In some embodiments, the fourth weights for the buffer periods of various objects 104 may be the same or different.

Computing device 102 determines priorities of the plurality of pending backup operations being executed based on the plurality of third weights, the plurality of fourth weights, the plurality of predicted execution durations, and the plurality of buffer periods.

In some embodiments, when the buffering periods of all tasks are the same, only the predicted execution duration may be considered to determine the priorities of the plurality of pending backup operations. In one example, a first total duration of the plurality of pending backup operations in each service of executing backup operations may be first determined by the following formula (2):

$$\text{First total duration} = \frac{\sum_{k=0}^{Number\ of\ objects} \text{Predicted execution duration}}{\text{Number of parallel services}} \quad (2)$$

The number of objects represents the number of all objects to be executed at a scheduling time, and the number of parallel services refers to the number of services that run on computing device 102 and may execute backup operations in parallel.

If the first total duration is less than the buffer period, the pending backup operation may be executed at the scheduling time based on the original priority. If the first total duration is greater than the buffer period, the predicted execution durations may be sorted, a predicted duration except for longer durations with the same number as the number of parallel services may be computed, and then a second total duration in each service of executing backup operations may be determined by the following formula (3):

$$\text{Second total duration} = \frac{\sum_{k=0}^{Number'\ of\ objects} \text{Predicted execution duration}}{\text{Number of parallel services}} \quad (3)$$

Number' of objects=number of objects−number of parallel services. If the second total duration is less than the duration of the buffer period, it is only necessary to reduce the priority of a pending backup operation with a longer duration for final execution. At this moment, it may be ensured that these pending backup operations meet the user requirements.

Through the above method, most of the original priorities between tasks can be retained, and minor adjustments can be made to minimize RPO failures without requiring additional system resources.

Figure 4:
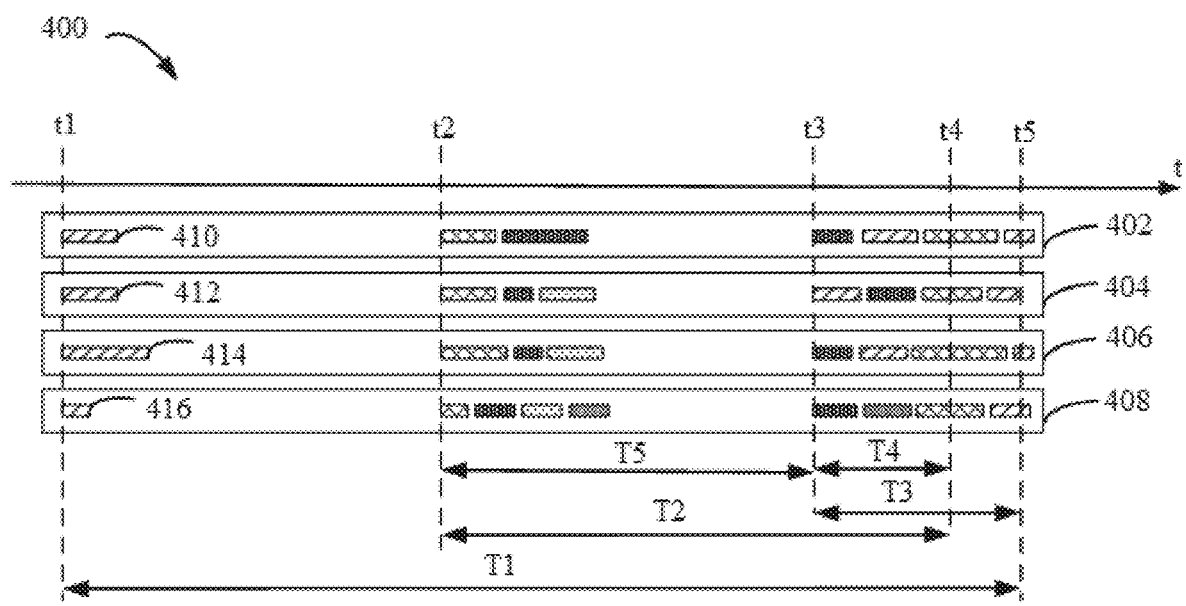
FIG. 4 illustrates schematic diagram 400 of an execution sequence of backup tasks according to an embodiment of the present disclosure.
Figure 5A:
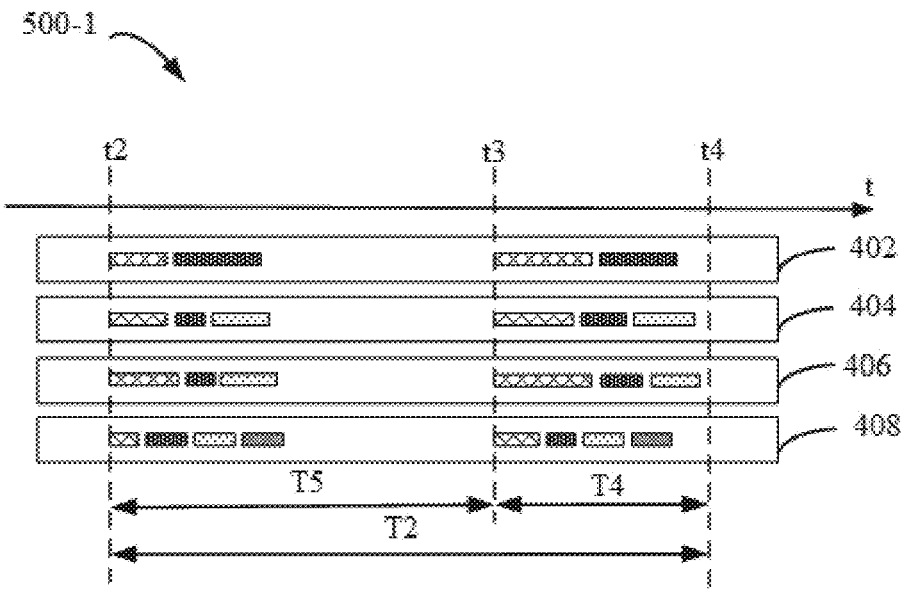
FIG. 5A illustrates schematic diagram 500-1 of an execution sequence of backup tasks according to an embodiment of the present disclosure.
Figure 5B:
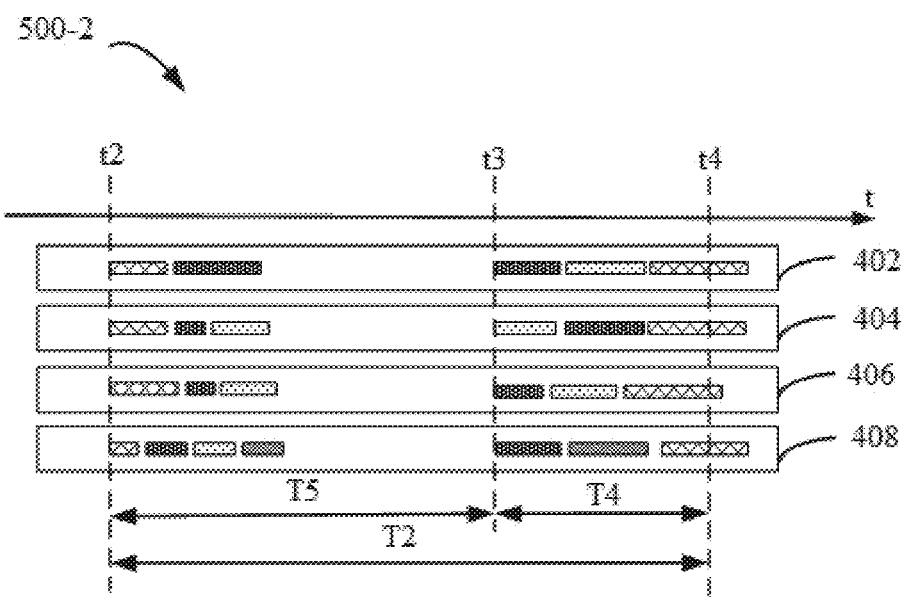
FIG. 5B illustrates schematic diagram 500-2 of an execution sequence of backup tasks according to an embodiment of the present disclosure.

The flowchart of method 300 for determining priorities according to an embodiment of the present disclosure has been described above with reference to FIG. 3. An execution sequence of backup tasks according to an embodiment of the present disclosure is described below with reference to FIGS. 4, 5A, and 5B. FIG. 4 illustrates schematic diagram 400 of an execution sequence of backup tasks according to an embodiment of the present disclosure. FIG. 5A illustrates schematic diagram 500-1 of an execution sequence of backup tasks according to an embodiment of the present disclosure. FIG. 5B illustrates schematic diagram 500-2 of an execution sequence of backup tasks according to an embodiment of the present disclosure.

As shown in FIG. 4, there are four services 402, 404, 406, and 408 executed in computing device 102, which process a backup operation of a first group of objects 104 at time t1 on a time axis t. Each service executes a backup operation of object 104, respectively. Durations 410, 412, 414, and 416 represent the durations of different backup operations, respectively. A threshold backup duration of the first group of objects 104 executed at time t1 is T1, which requires the next backup operation before time t5. These objects 104 are provided with a buffer period of duration T3. Therefore, object 104 executed at time t1 needs to schedule the pending backup operation at time t3.

In addition, services 402, 404, 406, and 408 execute backup operations of a second group of objects 104 at time t2. A threshold backup duration of the second group of objects 104 is T2, which has a buffer period of duration T4 between t3 and t4. Therefore, after executing the backup operations of these objects 104 from t2, a scheduling operation of backup tasks of these objects 104 is performed after duration T5, that is, at time t3. Therefore, the pending backup operations of the first group of objects 104 and the second group of objects 104 are performed at time t3. In order to ensure that the threshold backup duration set by each user is met (or is close as possible to being met), predicted durations of the pending backup operations of these objects 104 are first determined, and then the priority of the pending backup operation of each object 104 is determined using the above formula 1 according to the predicted durations in conjunction with the buffer period of each object 104. Then, the pending backup operations of these objects 104 are scheduled at t3 using the determined priorities. Through this mode, it is possible to make more backup operations meet user requirements on the basis of existing resources, thereby improving resource utilization and saving resources.

In some embodiments, if there is no pending backup operation for the first group of objects 104 at time t1 in FIG. 4, the pending backup task for the second group of objects 104 is only executed at time t2. At this moment, the second group of objects 104 have the same buffer period. Therefore, it is possible to determine the priority of the pending backup operation for each object 104 using only the predicted execution duration. A first total duration of the pending backup operation of the second group of objects 104 executed within each of services 402, 404, 406, and 408 is first computed at time t3 using the above formula (2). If the first total duration is less than T4, as shown in FIG. 5A, it is not necessary to adjust the priority of the pending backup operation of the object. At this moment, the pending backup operation of the second group of objects is executed based on the original priority of the current task without adjusting the execution sequence. In this way, the user requirements can be met without adjusting the priority.

If the first total duration of the second group of objects 104 within each of services 402, 404, 406, and 408 at time t3 is greater than T4, it indicates that there may be a problem that some tasks cannot meet the threshold backup period. Therefore, a second total duration is determined using the remaining predicted execution durations except for the predicted execution durations that are longer and equivalent to the number of services through the above formula (3).

If the second total duration is less than the duration of the buffer period, as shown in FIG. 5B, it is only necessary to reduce the priority of pending backup operations that are longer and equivalent to the number of parallel services, and these pending backup operations are finally executed. At this moment, it is also ensured that the user requirements can be met by only a few priority adjustments.

The above examples are only for describing the present disclosure, rather than specifically limiting the present disclosure. Those skilled in the art may use any suitable method to determine the execution sequence of the pending backup operations based on the priorities as required.

Figure 6:
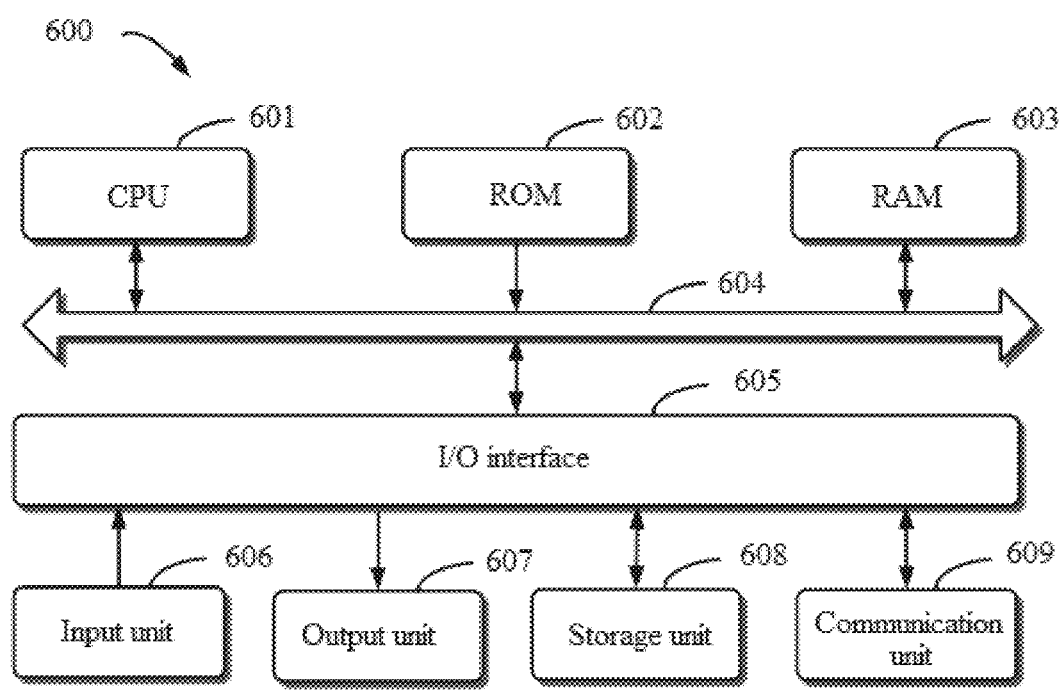
FIG. 6 illustrates a schematic block diagram of example device 600 applicable to implementation of an embodiment the present disclosure.

FIG. 6 illustrates a schematic block diagram of example device 600 that may be used to implement an embodiment of the present disclosure. For example, computing device 102 as shown in FIG. 1 may be implemented by device 600. As shown in the figure, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, such as methods 200 and 300, may be performed by processing unit 601. For example, in some embodiments, methods 200 and 300 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of methods 200 and 300 described above may be executed.

The present disclosure may be a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagating freely, electromagnetic waves propagating through waveguides or other transmission media (e.g., light pulses propagating through fiber-optic cables), or electrical signals transmitted over electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer may be connected to a user computer over any kind of networks, including a local area network (LAN) or wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus/system, and the computer program product according to embodiments of the present disclosure. It should be appreciated that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowchart and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flowcharts and/or block diagrams.

The flowcharts and block diagrams in the accompanying drawings illustrate the architectures, functions, and operations of possible implementations of the systems, methods, and computer program products according to multiple embodiments of the present disclosure. In this regard, each block in the flowcharts or block diagrams may represent a module, a program segment, or a part of an instruction that includes one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

Various embodiments of the present disclosure have been described above. The foregoing description is illustrative rather than exhaustive, and is not limited to the disclosed embodiments. Multiple modifications and variations will be apparent to those skilled in the art without departing from the scope and spirit of the illustrated various embodiments. The selection of terms as used herein is intended to best explain the principles and practical applications of the various embodiments or technical improvements of technologies on the market, or to enable other persons of ordinary skill in the art to understand the embodiments disclosed herein.

The invention claimed is:

1. A backup method, comprising:
determining a plurality of buffer periods associated with a plurality of pending backup operations of a plurality of objects, each buffer period of the plurality of buffer periods being a preprocessing period for a corresponding pending backup operation (CPBO) for one of the plurality of objects,
wherein each of the plurality of buffer periods is determined by:
before a user manages a backup operation of a corresponding object of the plurality of objects at a first time, setting, by the user, a threshold backup duration of the corresponding object and a corresponding buffer period of the plurality of buffer periods to meet the threshold backup duration;
determining a difference between the threshold backup duration and the corresponding buffer period to set execution of the CPBO at a second time that is after the first time,
wherein the corresponding buffer period is a period during which the CPBO is set to be executed before the CPBO's scheduled backup time,
wherein the CPBO specifies backing up a snapshot of a virtual machine to a storage device;
storing the corresponding buffer period in metadata of the corresponding object;
determining a plurality of predicted execution durations of the plurality of pending backup operations based on weighted average of historical execution durations of respective historical backup operations of the plurality of objects,
wherein when determining the plurality of predicted execution durations, a Holt-Winters seasonal prediction model is used;
determining priorities of the plurality of pending backup operations based on the plurality of predicted execution durations and the plurality of buffer periods
wherein when the plurality of buffer periods are the same, the priorities of the plurality of pending backup operations are determined based only on the plurality of predicted execution durations, and
executing the plurality of pending backup operations based on the priorities,
wherein a high-priority pending backup operation is executed before executing a low-priority pending backup operation,
wherein the high-priority pending backup operation and the low-priority pending backup operation are queued based on each backup operation's priority.

2. The method according to claim 1, further comprising:
determining the plurality of pending backup operations of the plurality of objects expected to be executed at a predetermined time.

3. The method according to claim 1, wherein determining the plurality of predicted execution durations comprises:
acquiring a plurality of historical execution durations of a plurality of historical backup operations of a first object among the plurality of objects within a predetermined time window; and
determining a predicted execution duration of a pending backup operation of the first object based on the plurality of historical execution durations.

4. The method according to claim 1, wherein executing the plurality of pending backup operations comprises:
determining an execution sequence of the plurality of pending backup operations based on the priorities; and
executing the plurality of pending backup operations based on the execution sequence.

5. The method according to claim 1, wherein determining the priorities comprises:
determining a first weight for the plurality of predicted execution durations, the first weight identifying an importance of the plurality of predicted execution durations in determining priorities;
determining a second weight for the plurality of buffer periods, the second weight identifying an importance of the plurality of buffer periods in determining priorities; and
determining priorities of the plurality of pending backup operations being executed based on the first weight, the second weight, the plurality of predicted execution durations, and the plurality of buffer periods.

6. The method according to claim 1, wherein determining the priorities comprises:
determining a plurality of first weights for the plurality of predicted execution durations, each first weight identifying an importance of a predicted execution duration corresponding to each object in determining priorities;
determining a plurality of second weights for the plurality of buffer periods, each second weight identifying an importance of a buffer period corresponding to each object in determining priorities; and
determining priorities of the plurality of pending backup operations being executed based on the plurality of first weights, the plurality of second weights, the plurality of predicted execution durations, and the plurality of buffer periods.

7. The method according to claim 1, further comprising:
determining an interval between a third time when a new backup is generated after a pending backup operation of a first object among the plurality of objects is executed and a fourth time when a previous backup of the first object is generated; and
determining that an error of the pending backup operation for the first object occurs in response to a duration of the interval being greater than a second threshold duration.

8. The method according to claim 1, wherein determining the plurality of buffer periods comprises:
acquiring the plurality of buffer periods from respective metadata of the plurality of objects.

9. The method according to claim 1, wherein the plurality of objects comprises at least one of a second virtual machine, a database, a file set, and a mail set.

10. An electronic device, comprising:
at least one processor; and
a memory, coupled to the at least one processor and having instructions stored thereon, wherein when executed by the at least one processor, the instructions cause the electronic device to perform a method, the method comprising:
determining a plurality of buffer periods associated with a plurality of pending backup operations of a plurality of objects, each buffer period of the plurality of buffer periods being a preprocessing period for a corresponding pending backup operation (CPBO) for one of the plurality of objects,
wherein each of the plurality of buffer periods is determined by:
before a user manages a backup operation of a corresponding object of the plurality of objects at a first time, setting, by the user, a threshold backup duration of the corresponding object and a corresponding buffer period of the plurality of buffer periods to meet the threshold backup duration;
determining a difference between the threshold backup duration and the corresponding buffer period to set execution of the CPBO at a second time that is after the first time,
wherein the corresponding buffer period is a period during which the CPBO is set to be executed before the CPBO's scheduled backup time, wherein the CPBO specifies backing up a snapshot of a virtual machine to a storage device;
storing the corresponding buffer period in metadata of the corresponding object;
determining a plurality of predicted execution durations of the plurality of pending backup operations based on weighted average of historical execution durations of respective historical backup operations of the plurality of objects,
wherein when determining the plurality of predicted execution durations, a Holt-Winters seasonal prediction model is used;
determining priorities of the plurality of pending backup operations based on the plurality of predicted execution durations and the plurality of buffer periods
wherein when the plurality of buffer periods are the same, the priorities of the plurality of pending backup operations are determined based only on the plurality of predicted execution durations, and
executing the plurality of pending backup operations based on the priorities,
wherein a high-priority pending backup operation is executed before executing a low-priority pending backup operation,
wherein the high-priority pending backup operation and the low-priority pending backup operation are queued based on each backup operation's priority.

11. The electronic device according to claim 10, wherein the method further comprises:
determining the plurality of pending backup operations of the plurality of objects expected to be executed at a predetermined time.

12. The electronic device according to claim 10, wherein determining the plurality of predicted execution durations comprises:
acquiring a plurality of historical execution durations of a plurality of historical backup operations of a first object among the plurality of objects within a predetermined time window; and
determining a predicted execution duration of a pending backup operation of the first object based on the plurality of historical execution durations.

13. The electronic device according to claim 10, wherein executing the plurality of pending backup operations comprises:
determining an execution sequence of the plurality of pending backup operations based on the priorities; and
executing the plurality of pending backup operations based on the execution sequence.

14. The electronic device according to claim 10, wherein determining the priorities comprises:
determining a first weight for the plurality of predicted execution durations, the first weight identifying an importance of the plurality of predicted execution durations in determining priorities;
determining a second weight for the plurality of buffer periods, the second weight identifying an importance of the plurality of buffer periods in determining priorities; and
determining priorities of the plurality of pending backup operations being executed based on the first weight, the second weight, the plurality of predicted execution durations, and the plurality of buffer periods.

15. The electronic device according to claim 10, wherein determining the priorities comprises:

determining a plurality of first weights for the plurality of predicted execution durations, each first weight identifying an importance of a predicted execution duration corresponding to each object in determining priorities;
determining a plurality of second weights for the plurality of buffer periods, each second weight identifying an importance of a buffer period corresponding to each object in determining priorities; and
determining priorities of the plurality of pending backup operations being executed based on the plurality of first weights, the plurality of second weights, the plurality of predicted execution durations, and the plurality of buffer periods.

16. The electronic device according to claim 10, wherein the method further comprises:
determining an interval between a third time when a new backup is generated after a pending backup operation of a first object among the plurality of objects is executed and a fourth time when a previous backup of the first object is generated; and
determining that an error of the pending backup operation for the first object occurs in response to a duration of the interval being greater than a second threshold duration.

17. The electronic device according to claim 10, wherein determining the plurality of buffer periods comprises:
acquiring the plurality of buffer periods from respective metadata of the plurality of objects.

18. The electronic device according to claim 10, wherein plurality of object comprises at least one of a second virtual machine, a database, a file set, and a mail set.

19. A computer program product, tangibly stored on a non-volatile computer-readable medium and comprising machine-executable instructions, wherein the machine-executable instructions, when executed, cause a machine to perform a method, the method comprising:
determining a plurality of buffer periods associated with a plurality of pending backup operations of a plurality of objects, each buffer period of the plurality of buffer periods being a preprocessing period for a corresponding pending backup operation (CPBO) for one of the plurality of objects,
wherein each of the plurality of buffer periods is determined by:
before a user manages a backup operation of a corresponding object of the plurality of objects at a first time, setting, by the user, a threshold backup duration of the corresponding object and a corresponding buffer period of the plurality of buffer periods to meet the threshold backup duration;
determining a difference between the threshold backup duration and the corresponding buffer period to set execution of the CPBO at a second time that is after the first time,
wherein the corresponding buffer period is a period during which the CPBO is set to be executed before the CPBO's scheduled backup time,
wherein the CPBO specifies backing up a snapshot of a virtual machine to a storage device;
storing the corresponding buffer period in metadata of the corresponding object;
determining a plurality of predicted execution durations of the plurality of pending backup operations based on weighted average of historical execution durations of respective historical backup operations of the plurality of objects, wherein when determining the plurality of predicted execution durations, a Holt-Winters seasonal prediction model is used;

determining priorities of the plurality of pending backup operations based on the plurality of predicted execution durations and the plurality of buffer periods wherein when the plurality of buffer periods are the same, the priorities of the plurality of pending backup operations are determined based only on the plurality of predicted execution durations, and executing the plurality of pending backup operations based on the priorities, wherein a high-priority pending backup operation is executed before executing a low-priority pending backup operation, wherein the high-priority pending backup operation and the low-priority pending backup operation are queued based on each backup operation's priority.

20. The computer program product to claim 19, wherein determining the priorities comprises:

determining a first weight for the plurality of predicted execution durations, the first weight identifying an importance of the plurality of predicted execution durations in determining priorities;

determining a second weight for the plurality of buffer periods, the second weight identifying an importance of the plurality of buffer periods in determining priorities; and determining priorities of the plurality of pending backup operations being executed based on the first weight, the second weight, the plurality of predicted execution durations, and the plurality of buffer periods.

* * * * *